United States Patent [19]
Bray et al.

[11] Patent Number: 5,577,113
[45] Date of Patent: Nov. 19, 1996

[54] APPARATUS AND METHOD FOR VIRTUAL PRIVATE TELEPHONE LINE WITH AUTOMATIC RING DOWN

[75] Inventors: Paul M. Bray, Garland; Douglas R. Cardy, Plano; Charles P. Shelton, McKinney, all of Tex.

[73] Assignee: DSC Communications Corporation, Plano, Tex.

[21] Appl. No.: 525,964

[22] Filed: Sep. 8, 1995

Related U.S. Application Data

[63] Continuation of Ser. No. 189,904, Feb. 1, 1994, Pat. No. 5,487,110.

[51] Int. Cl.[6] .................................................. H04M 7/10
[52] U.S. Cl. .................... 379/220; 379/207; 379/229; 379/241; 379/246
[58] Field of Search ................................. 379/201, 207, 379/220, 219, 229, 230, 241, 240, 243, 244, 246, 221

[56] References Cited

U.S. PATENT DOCUMENTS

| | | | |
|---|---|---|---|
| 3,637,946 | 1/1972 | Hamrick | 379/241 |
| 3,700,822 | 10/1972 | Fritschi | 379/241 |
| 4,982,421 | 1/1991 | Kirsch et al. | 379/216 |
| 5,046,181 | 9/1991 | Higuchi et al. | 379/241 |
| 5,303,290 | 4/1994 | Redberg et al. | 379/241 |

FOREIGN PATENT DOCUMENTS

| | | | |
|---|---|---|---|
| 0083397 | 6/1980 | Japan | 379/241 |
| 0314496 | 12/1989 | Japan | 379/241 |

*Primary Examiner*—Krista M. Zele
*Assistant Examiner*—Parag Dharia
*Attorney, Agent, or Firm*—Baker & Botts, L.L.P.

[57] ABSTRACT

Apparatus and method for establishing a virtual private line with automatic ring down is provided. The virtual private line uses the SS7 switching network of present telephone systems coupled between the customer premises equipment of two virtual private line customers.

37 Claims, 4 Drawing Sheets

APPARATUS AND METHOD FOR VIRTUAL PRIVATE TELEPHONE LINE WITH AUTOMATIC RING DOWN

CROSS REFERENCE TO RELATED APPLICATIONS

This application is a continuation application of U.S. application Ser. No. 08/189,904, filed Feb. 1, 1994 and entitled "Apparatus and Method for Virtual Private Telephone Line with Automatic Ring Down," now U.S. Pat. No. 5,487,110, issued Jan. 23, 1996.

TECHNICAL FIELD OF THE INVENTION

This invention relates in general to the field of telephony. More particularly, the present invention relates to apparatus and a method for virtual private telephone lines with automatic ring down.

BACKGROUND OF THE INVENTION

Dedicated private telephone lines between two parties have been established in the past by physically installing and maintaining a hard-wired telephone line connection between the parties. Facilities that are "manual ring down" requires the user to push a designated button on the telephone to ring the user on the other end of the hard-wired telephone line. The parties using a dedicated hard-wired telephone line with the "automatic ring down" feature may ring the other end of the line and establish a connection by simply raising the telephone handset or otherwise going "off-hook." Since the need to memorize and dial telephone numbers or even speed-dial numbers is obviated, the path of communication is established immediately. The private line service is typically favored by customers who make large volumes of calls from and to fixed locations and whose business requires continuous and uninterrupted lines of communication between those locations. A prime example of such a customer is a brokerage firm maintaining offices in Chicago and New York.

Needless to say, such dedicated hard-wired facilities are extremely expensive and difficult to install and maintain. Nevertheless, since such dedicated line service is demanded by certain telephone service subscribers, it has become desirable to provide a service that emulates a dedicated private telephone line but that does not require a physical hard-wire telephone connection. Accordingly, it has become desirable to use the existing telephone switching networks to establish private telephone line service. In particular, it is advantageous to use the rapid call setup ability of industry standard Signaling System 7 (SS7) to quickly establish private line calls with automatic ring down using the switched network.

SUMMARY OF THE INVENTION

In accordance with the present invention, apparatus and a method for a virtual private line with automatic ring down are provided which substantially eliminate or reduce disadvantages and problems associated with prior hot line or private line services.

In one aspect of the present invention, apparatus for a virtual private telephone connection between a User A telephone equipment and a User B telephone equipment is provided. The apparatus includes a first telephone switch coupled to the User A telephone equipment. The first telephone switch is capable for switching a plurality of trunk groups including at least one virtual private line trunk group. The virtual private line trunk group may include one or more trunk circuits. User B's telephone equipment is coupled to a second telephone switch which is also coupled to the first telephone switch. The second telephone switch is capable for switching a plurality of trunk groups including at least one virtual private line trunk group. Further included is a database which contains data for associating the virtual private line trunk group of the first switch with the virtual private line trunk group of the second switch. The apparatus also includes means for processing virtual private telephone connections between the User A and User B telephone equipment.

In another aspect of the present invention, a method for establishing a virtual private telephone line with automatic ring down between at least one User A telephone coupled to an originating trunk group and switch and at least one User B telephone coupled to a terminating trunk group and switch is provided. The originating switch is coupled to the terminating trunk group by an SS7 switched network. The steps include detecting User A telephone being off-hook and associating the originating trunk group coupled to User A telephone with the terminating switch and trunk group. User B's telephone is then alerted and User B's answering the call is detected. A virtual private line connection is then established between the User A telephone and the User B telephone.

An important technical advantage of the present invention is providing the benefits of a private line or an immediate hotline without the disadvantage of the physical hard-wiring. The virtual private line emulates a hard-wired private line by advantageously providing automatic ring down, end-to-end glare resolution, equitable billing arrangements based on originating usage, and other desirable features.

BRIEF DESCRIPTION OF THE DRAWINGS

For a better understanding of the present invention, reference may be made to the accompanying drawings, in which.

DETAILED DESCRIPTION OF THE INVENTION

Figure 1:
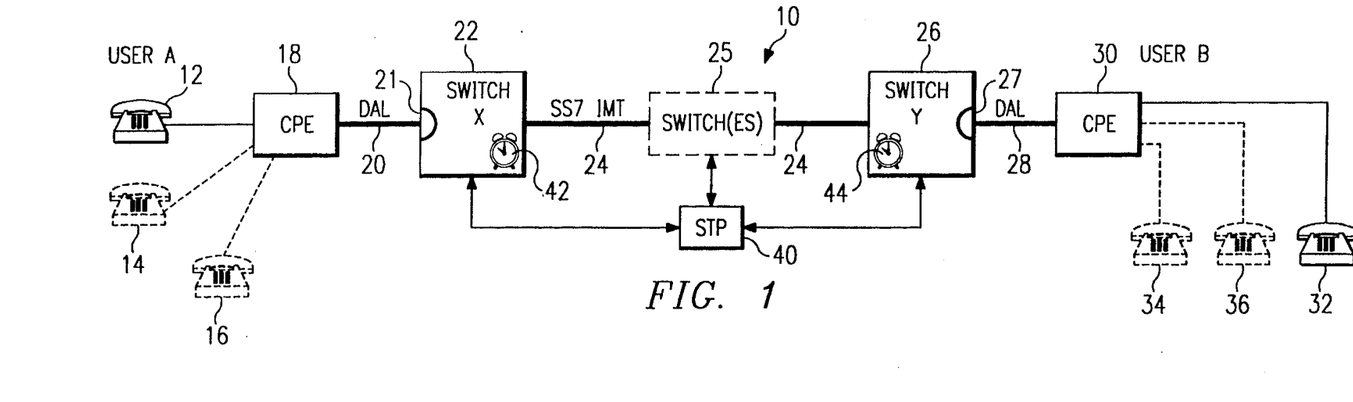
FIG. 1 is a greatly simplified high level block diagram of a preferred embodiment of the virtual private line circuit using an SS7 switch network.

With reference to the drawings, FIG. 1 illustrates a representative SS7 (Signaling System 7) telephone switch network diagram establishing a virtual private telephone line with automatic ring down, indicated generally at 10 and constructed according to the teaching of the present invention. The virtual private line is shown established between two subscribers, User A and User B. In general, subscribers at both ends of the virtual private line circuit use key telephone systems and the virtual private line is a "direct appearing line" on one or more user telephones.

As shown in FIG. 1, User A has dedicated three telephones 12–16 to this virtual private line, which are coupled to User A's customer premises equipment (CPE) telephone system 18. Customer premises equipment are equipment located on a customer's premises such as ISDN digital PBXs, non-ISDN digital PBXs, analog PBXs, processor-controlled ISDN multiplexers, and processor-controlled bridges or routers. The customer premises equipment 18 is connected to a network switch X 22 via a Dedicated Access Line (DAL) 20. A representation of a database 21 is shown, which associates an incoming virtual private line trunk group with the Terminating Switch Identification number (TSID) and virtual private line Terminating Trunk Group (TTG) identification number. The telephone number or switch and trunk group identification provides the routing information for the virtual private line setup. Preferably, the database 21 is indexed by the incoming trunk group number and provides a 10-digit direct distance dialing (DDD) number or a 7-digit TSID+TTG pilot number as known in the telephony industry. Since SS7 is used, normal SS7 call processing procedures in addition to other processing methods are employed. Details of the virtual private telephone line processing is discussed below in conjunction with FIGS. 2–7.

Switch X 22 is shown coupled to a switch or a network of switches 25 and 26 via SS7 Inter Machine Trunk (IMT) connections 24. Switch(es) 22, 25, and 26 may represent Local Access and Transport Area and/or Inter Exchange Carrier switches. Switch(es) 25 is in turn connected to a Switch Y 26 which is coupled to User B's customer premises equipment (CPE) 30 via a dedicated access line (DAL) 28. As shown, Switch Y 26 also includes a database 27 containing routing information for the virtual private line. As shown, User B has three dedicated telephones 32–36 for the virtual private telephone service. Switches X 22 and Y 26 may be implemented by currently available switches such as the MegaHub 600E manufactured by DSC Communications Corporation of Plano, Tex., and the like. However, the virtual private line automatic ring down service implementation of the present invention preferably requires only a software modification and/or additions in the originating and terminating Switches X and Y. The details of the software modification and/or additions are discussed below in conjunction with FIGS. 2–7. As shown in FIG. 1, the virtual private line between Users A and B is arranged over three trunk circuits in a designated trunk group. However there is no upper limit for the number of trunk circuits that can be maintained in the virtual private line connection between two users.

A brief overview of the operations of virtual private line with automatic ring down would be beneficial. Initially, assume no telephones 12–16 and 32–36 are in use. If User A now picks up the handset of telephone 12, this fact is transmitted to Switch X 22 via CPE 18 and DAL 20. Switch X 22 recognizes that the trunk circuit used by telephone 12 belongs to a trunk group that has been designated as a virtual private line trunk group. Switch X 22 may maintain a database or table (not shown) that identifies a virtual private line trunk group by a trunk group number assigned to it. Switch X 22 then may access database 21 to determine the corresponding destination switch and virtual private line trunk group for User A.

Having determined that User B is the destination user for User A, Switch X 22 proceeds with the steps necessary to establish a connection with Switch Y 26 and User B. Since three telephones 32–36 are connected to the virtual private line, Switch Y 26 uses a trunk selection strategy or terminating circuit selection method to determine which telephone to ring. Such trunk circuit selection algorithms are widely used in the telephony industry, one of which can be studied by referring to, for example, *LATA Switching Systems Generic Requirements—Tandem Supplement*, Document no. TR-TSY-000540, issued in July, 1987 by Bell Communications Research. It is apparent from this discussion that the originating and terminating trunk groups of a virtual private line should contain the same number of trunks in order for all calls to complete. It is further apparent that the virtual private line of the present invention has an automatic ring down feature.

FIGS. 2–7 are timing and data flow diagrams showing preferred embodiments of various call processing scenarios. In these diagrams, the passage of time is represented in the vertical axis, while the data or messages are shown originating from specific hardware components and received by specific components corresponding to the network representation diagram shown in FIG. 1. An explanation of the acronyms used in the diagrams, specification and the claims is summarized in the table below. The SS7 messages generated by the switches 22, 25 and 26 are relayed or transmitted to the destination switches by a signaling network represented by Signal Transfer Point (STP) 40 as known in the art. A detailed description of the various SS7 message formats and contents can be found in Chapters T1.113.1, T1.113.2, and T1.113.3-1992, *Functional Description of the Integrated Services Digital Network* (ISDN) User Part issued by American National Standard.

| ACRONYMS AND TERMINOLOGY | |
|---|---|
| ACM | SS7 Address Complete Message |
| ANM | Answer Message |
| CPE | Customer Premises Equipment |
| DAL | Dedicated Access Line |
| DDD | Direct Distance Dialing Number |
| IAM | SS7 Initial Address Message |
| IMT | Inter Machine Truck |
| REL | SS7 Release Message |
| RES | SS7 Resume Message |
| RLC | SS7 Release Complete Message |
| SUS | SS7 Suspend Message |
| SS7 | Signaling System 7 |
| VPL | Virtual Private Line |

Figure 2:
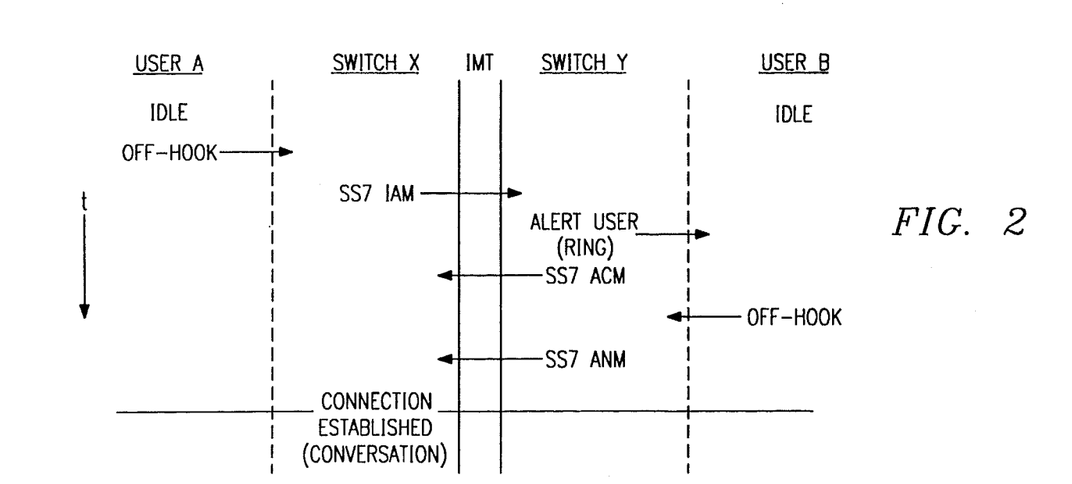
FIG. 2 is a timing and signal flow diagram depicting a preferred embodiment of a normal call origination and setup scenario.

Referring to FIG. 2, a timing and signal flow diagram shows a preferred embodiment of a normal call origination and setup. Both User A and User B begin with their telephones on-hook, as indicated by the designation "IDLE" in the diagram. User A then went off-hook. In other words, User A raised the handset off the cradle of the phone, or otherwise turned the telephone on. When User A goes off-hook, Switch X recognizes a virtual private line request for service, and obtains special routing information such as a 7 or 10 digit number for identifying the terminating switch and trunk group. Switch X then initiates a call by sending an SS7 IAM message to the terminating switch or Switch Y in this instance. The IAM message contains the originating switch identification number and trunk group in the generic digits parameter in addition to other information as defined by the SS7 protocol. Switch Y receives the SS7 IAM message, alerts User B by ringing a selected one of his telephones, and returns an SS7 ACM message to Switch X. When User B picks up the telephone handset or goes off-hook, Switch Y is alerted and sends an SS7 ANM message to Switch X. In this manner, Switches X and Y establish a voice path and Users A and B converse.

Figure 3:
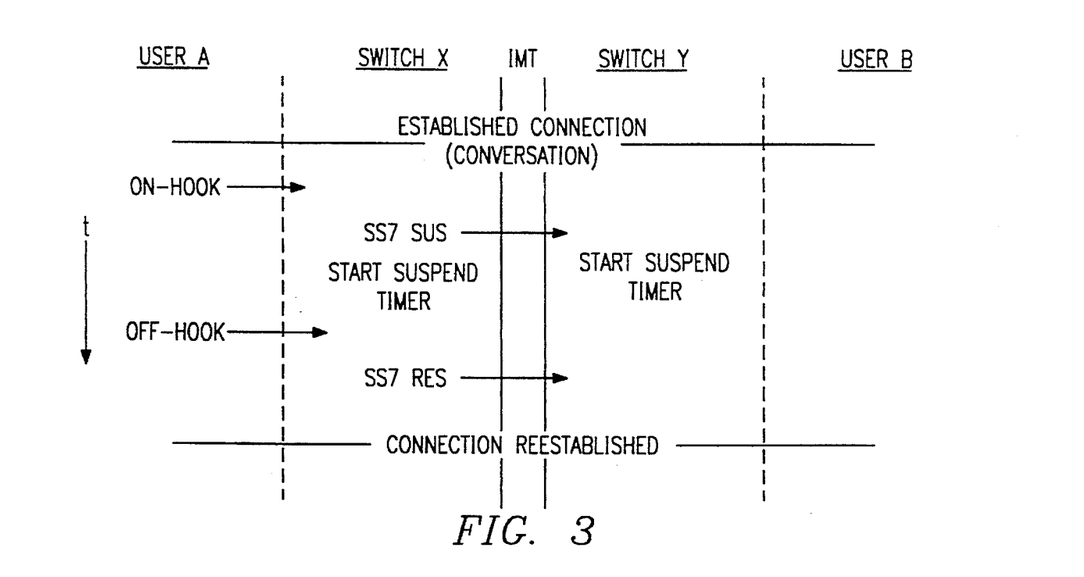
FIG. 3 is a timing and signal flow diagram depicting a preferred embodiment of a call suspend and resumption scenario.

Referring to FIG. 3, a preferred embodiment of call suspend and resume processing is shown. This is the scenario where the established connection is maintained when one of the users hangs up temporarily and then goes off-hook again. As shown initially, Users A and B are conversing via an established virtual private line connection. It is irrelevant in the preferred embodiment whether User A or User B initiated the call. As shown in FIG. 3, User A then hangs up or goes on-hook. In response to User A hanging up, Switch X issues an SS7 SUS message to Switch Y and starts the suspend timer 42. Switch Y also starts its suspend timer 44 in response to the SS7 SUS message from Switch X. The suspend timer is generally set to expire in approximately twenty to thirty seconds. As indicated in FIG. 3, User A then picks up the telephone again prior to the expiration of the suspend timer, which directs Switch X to send an SS7 RES message to Switch Y. The connection is then reestablished. It is worthwhile to note that User B, as the non-originating user, may also go on-hook temporarily and suspend the call and then have the ability to resume the call by going off-hook again as shown in FIG. 3.

Figure 4:
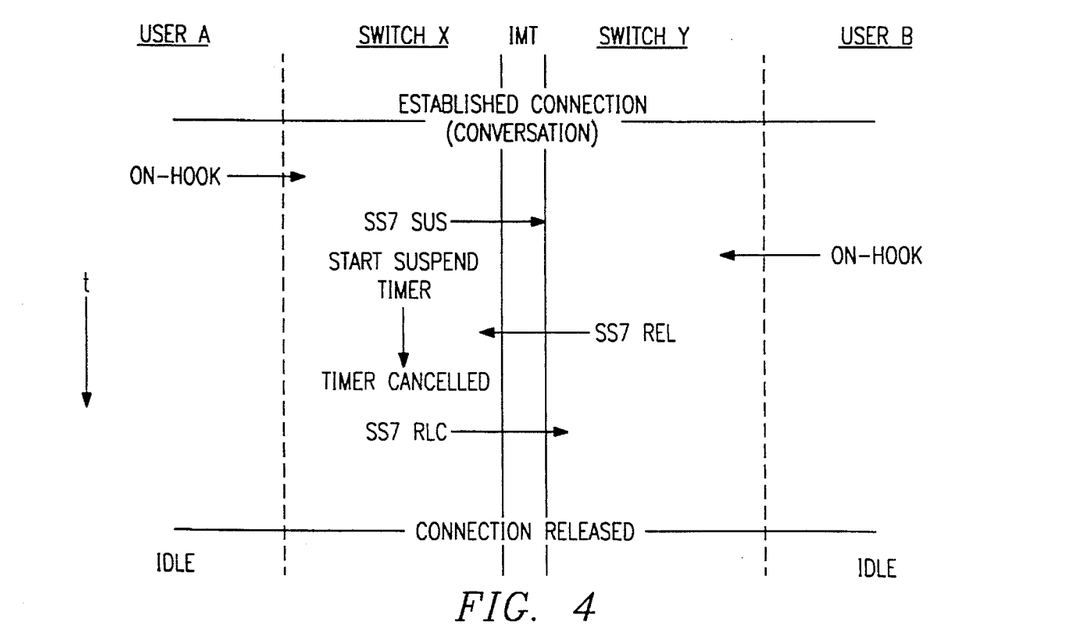
FIG. 4 is a timing and signal flow diagram depicting a preferred embodiment of a normal call release scenario.

Referring to FIG. 4, a normal call release scenario is shown. At the end of the conversation, User A first goes on-hook, which directed Switch X to send an SS7 SUS message to Switch Y and to also start the suspend timer. At approximately the same time or shortly thereafter, User B also goes on-hook, directing Switch Y to send an SS7 REL message to Switch X in response to Switch X's SUS message. Switch X then responds by cancelling the suspend timer and sending Switch Y an SS7 RLC message. This terminates the phone call and the connection is released. It can be seen that the same processing steps also apply if User B goes on-hook before User A in this scenario. The resulting timing diagram would merely be a mirror reflection of FIG. 4.

Figure 5:
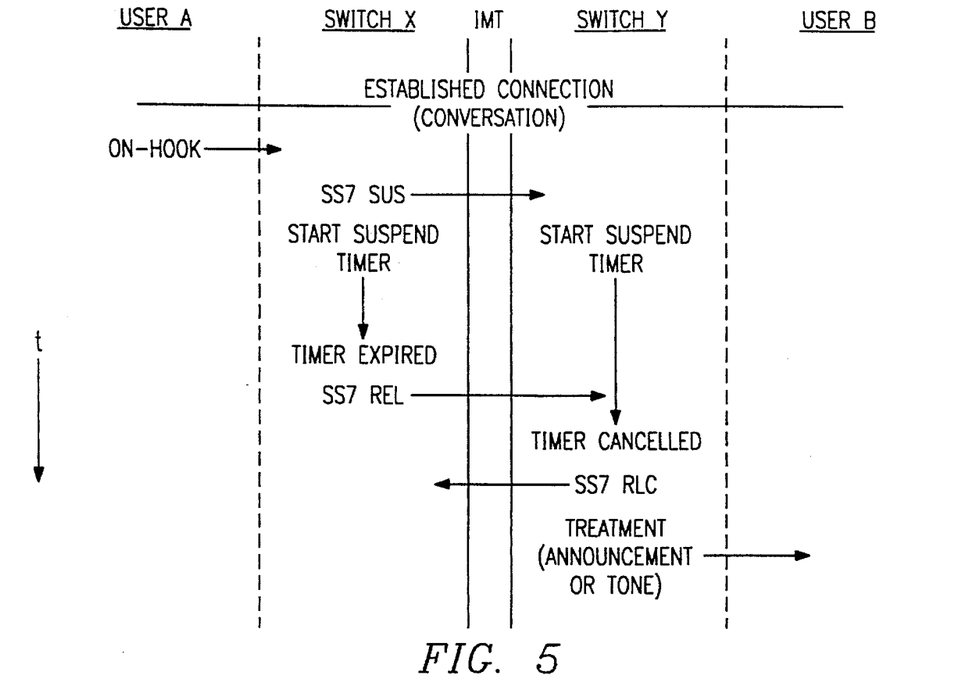
FIG. 5 is a timing and signal flow diagram depicting a preferred embodiment of a call expiration scenario with notification to the user remaining off-hook.

FIG. 5 illustrates the preferred processing of call expiration with notification to the user remaining off-hook. The diagram begins with Users A and B conversing via the established virtual private line connection. User A hangs up and goes on-hook, which directs Switch X to send an SS7 SUS message to Switch Y. Both Switches start the suspend timers. This time the suspend timers expire before User A picks the phone-back up, so Switch X issues an SS7 REL message to Switch Y, and Switch Y cancels the suspend timer and responds with an SS7 RLC message. Switch Y then notifies User B, who is still off-hook, with either a recorded voice message or an audible tone of a predetermined frequency and characteristics. This treatment alerts User B that User A has hung up and has not resumed the call so that User B should also hang up to terminate the call.

Figure 6:
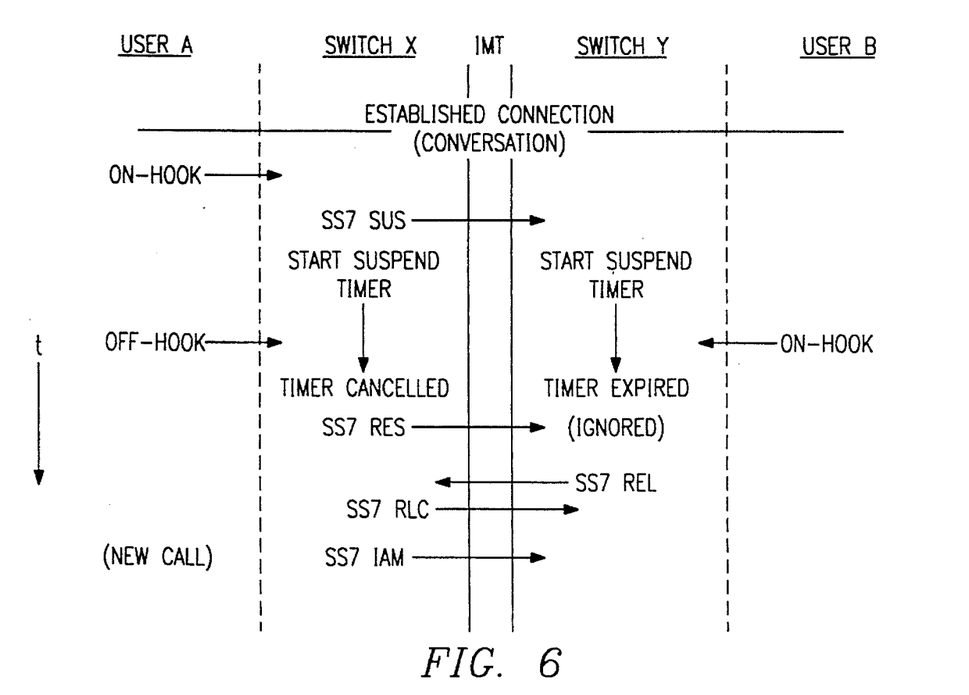
FIG. 6 is a timing and signal flow diagram depicting a preferred embodiment of processing of premature off-hook during release sequence.

FIG. 6, shows the preferred method of processing a premature off-hook during a release sequence. This scenario occurs when both callers have hung up the phone having terminated a call, but one or both of them pick up the telephone handset too quickly before the release processing of the previous call has been completed. As shown in the diagram, User A goes on-hook at the end of the conversation, which prompts Switch X to issue an SS7 SUS message to Switch Y and to start the suspend timer. Switch Y also starts its suspend timer in response to the SS7 SUS message from Switch X. User B then goes on-hook also to terminate the call, which may precede or be simultaneous with User A's going off-hook again. Therefore, the SS7 RES message sent by Switch X, in response to User A's going off-hook and received subsequently to detecting User B's telephone being on-hook, is simply ignored by Switch Y. At the expiration of the suspend timer, Switch Y issues an SS7 REL message to Switch X. Switch X sends an SS7 RLC to Switch Y to signal the completion of the release. If User A remains off-hook, a new call is established in a manner identical to that described above and showed in FIG. 2.

Figure 7:
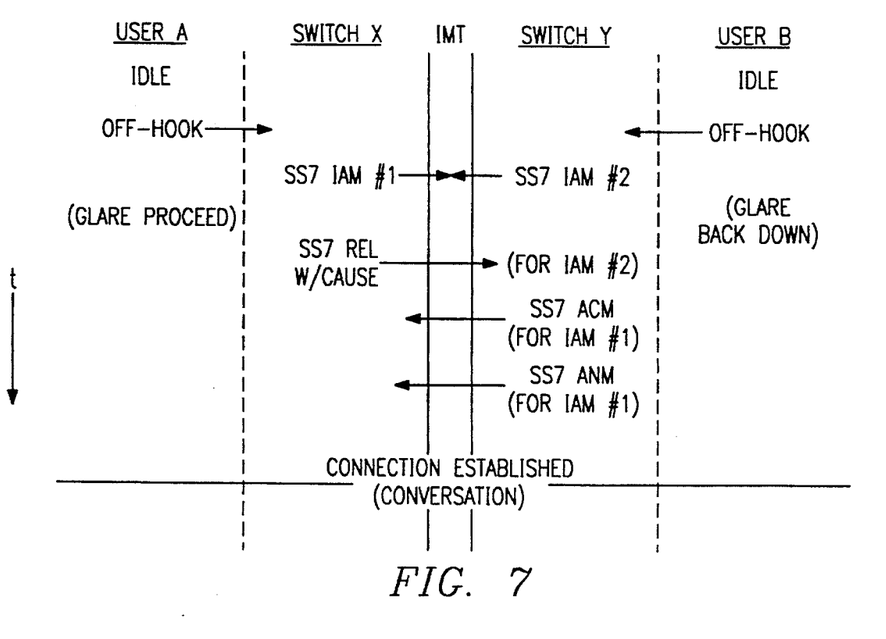
FIG. 7 is a timing and signal flow diagram depicting a preferred embodiment of an end-to-end glare resolution scenario.

In FIG. 7, the processing to resolve a special end-to-end glare situation is shown. End-to-end glare occurs when both User A and User B go off-hook simultaneously or nearly simultaneously. In a private line service using a physical hard-wired dedicated line, such occurrence simply produces an established connection between the subscribers to the private line. However, because the switched telephone network is used in the instant invention, when both users go off-hook an end-to-end glare situation is produced as both Switches X and Y attempt to set up the connection with each other. This situation is more common when only one trunk circuit is dedicated to a virtual private line trunk group, or when the multiple trunk circuits in the virtual private line trunk group are always busy so that only one trunk is generally free at any one time. The end-to-end glare is resolved in the following manner.

Referring to FIG. 7, both Users A and B pick up the telephone handset substantially simultaneously. This is conveyed to the respective Switches X and Y, each of which sends an SS7 IAM message to each other in an attempt to initialize call setup. To differentiate the IAMs, they are designated as #1 and #2, sent by Switch X and Switch Y, respectively. When Switch X receives the IAM #2 message from Switch Y and Switch Y receives the IAM #1 message from Switch X, both Switches realize that an end-to-end glare situation is occurring. Each switch then independently compares its own switch identification number with the identification number of the other switch. The switch with the lower switch identification number is given permission to proceed as the originating switch in call setup, and the other switch backs down. If the switch identification numbers are the same, then trunk group identification numbers of the respective virtual private line trunk groups are compared, and the switch with the lower virtual private line trunk group identification number proceeds as the originating switch. For example, assume that Switch X has a lower switch or trunk group identification number, therefore Switch Y backs down and Switch X proceeds. Switch X issues an SS7 REL message with a predetermined cause code to Switch Y indicating that the switch associated with IAM #2 is to back down, and the switch associated with IAM #1 is to proceed. Thereafter, Switch Y sends an SS7 ACM and ANM messages to Switch X, generally following the normal call setup procedure shown in FIG. 2. The call origination from User B will proceed from Switch Y to Switch X in the manner generally following the normal call setup as in FIG. 2. In this manner, end-to-end glare is resolved and connection between Users A and B is established.

Implemented in the manner discussed above, a virtual private line with automatic ring down is provided which advantageously uses existing SS7 based telephone switching networks. Where not specifically discussed, standard SS7 processing applies. Although SS7 has been specifically identified and described in conjunction with the virtual private line, it is contemplated that other switching protocols and networks may be similarly adapted for the implementation of the virtual private line with automatic ring down.

Furthermore, although the present invention has been described in detail, it should be understood that various changes, substitutions and alterations can be made thereto without departing from the spirit and scope of the present invention as defined by the appended claims.

What is claimed is:

1. Apparatus for a virtual private telephone connection between a User A telephone equipment and a User B telephone equipment, comprising:

a first telephone switch coupled to said User A telephone equipment, said first telephone switch capable for switching a plurality of trunk groups including at least one virtual private line trunk group;

a second telephone switch coupled to said first telephone switch and further coupled to said User B telephone equipment, said second telephone switch capable for switching a plurality of trunk groups including at least one virtual private line trunk group at least one optional telephone switch coupled between said first and second telephone switches;

a database residing in both said first and second telephone switches, being capable of associating said virtual private line trunk group of said first switch with said virtual private line trunk group of said second switch;

means for detecting a substantially simultaneous requests for service from both said User A and B telephone equipment;

means for selecting one of said User A telephone equipment and said User B telephone equipment as an originator of call setup and the other as a terminator of call setup and transmitting a Release Message to only said selected call terminator; and means for accepting said request for service from said originator user telephone equipment and continuing to establish said virtual private line connection.

2. The apparatus, as set forth in claim 1, wherein said User A telephone equipment includes at least one telephone and said User B telephone equipment includes at least the same number of telephones as User A.

3. The apparatus, as set forth in claim 2, wherein said virtual private telephone connection processing means comprises:

means coupled to said User A telephone equipment for detecting said User A telephone being off-hook;

means coupled to said User B telephone equipment for detecting said User B telephone being off-hook;

means for transmitting an SS7 Initial Address Message from said first telephone switch to said second telephone switch;

means for transmitting another SS7 Initial Address Message from said second telephone switch to said first telephone switch;

means residing in said first and second telephone switches for comparing a switch identification number of said first telephone switch with a switch identification number of said second telephone switch in response to receiving said SS7 Initial Address Message from said second telephone switch and said SS7 Initial Address Message from said first telephone switch;

means residing in said first and second telephone switches for comparing a trunk group identification number of said virtual private line trunk group of said first telephone switch with a trunk group identification number of said virtual private line trunk group of said second telephone switch in response to the switch identification numbers being identical;

means for transmitting an SS7 Release Message from the telephone switch with the lower switch or trunk group identification number to the telephone switch with the higher switch or trunk group identification number;

means for transmitting an SS7 Address Complete Message from the telephone switch with the higher switch or trunk group identification number to the telephone switch with the lower switch or trunk group identification number in response to receiving the SS7 Release Message; and means for transmitting an SS7 Answer Message from the telephone switch with the higher switch or trunk group identification-number to the telephone switch with the lower switch or trunk group identification number, and establishing the virtual private line connection.

4. The apparatus, as set forth in claim 2, wherein the virtual private line processing means comprises:

means residing in said first telephone switch for transmitting an SS7 Initial Address Message to said second telephone switch;

means coupled to said User B telephone equipment for ringing said User B telephone in response to receiving said SS7 Initial Address Message by said second telephone switch;

means residing in said second telephone switch for transmitting an SS7 Address Complete Message to said first telephone switch in response to said received SS7 Initial Address Message;

means coupled to said User B telephone equipment for detecting said User B telephone being off-hook; and means residing in said second telephone switch for transmitting an SS7 Answer Message to said first telephone switch in response to detecting said User B telephone being off-hook, and establishing a virtual private line connection.

5. The apparatus, as set forth in claim 4, wherein the virtual private line processing means comprises:

means in response to establishing the virtual private line connections coupled to said User A telephone equipment for detecting said User A telephone being on-hook;

means residing in said first telephone switch for transmitting an SS7 Suspend message to said second telephone switch in response to said User A telephone being on-hook;

a suspend timer residing in said first telephone switch for keeping the time that said User A telephone being on-hook and expiring within a predetermined amount of time;

means for detecting said User A telephone being off-hook prior to the expiration of said suspend timer and alerting said first switch accordingly; and means residing in said first telephone switch for transmitting an SS7 Resume message to said second telephone switch in response to the alert from said detecting means and reestablishing the virtual private line connection.

6. The apparatus, as set forth in claim 4, wherein said virtual private line processing means comprises:

means in response to establishing the virtual private line connection coupled to said User B telephone equipment for detecting said User B telephone being on-hook;

means residing in said second telephone switch for transmitting an SS7 Suspend message to said first telephone switch in response to said User B telephone being on-hook;

a suspend timer residing in said second telephone switch for keeping the time that said User B telephone being on-hook and expiring within a predetermined amount of time;

means coupled to said User B telephone equipment for detecting said User B being off-hook prior to the expiration of said suspend timer and alerting said second switch accordingly; and means residing in said second telephone switch for transmitting an SS7 Resume message to said first telephone switch in response to the alert from said detecting means and reestablishing the virtual private line connection.

7. The apparatus, as set forth in claim 1, wherein said database includes a one-to-one correspondence between said first and second telephone switches and virtual private line trunk groups, said database being accessible by indexing with an originating trunk group identification number and accessing the corresponding terminating switch and trunk group identification numbers in said database.

8. The apparatus, as set forth in claim 1, wherein said first telephone switch and said second telephone switch each maintains a database associating said first telephone switch and trunk group with said second telephone switch and trunk group and vice versa.

9. The apparatus, as set forth in claim 1, wherein said virtual private line processing means resolves end-to-end glare.

10. Apparatus for a virtual private telephone line connection between two callers using a first and second customer premises equipment respectively, comprising:

a first telephone switch coupled to said first customer premises equipment, said first telephone switch capable for switching a plurality of trunk groups including at least one virtual private line trunk group;

a second telephone switch coupled to said second customer premises equipment, said second telephone switch capable for switching a plurality of trunk groups including at least one virtual private line trunk group;

an SS7 switched network coupled between said first and second telephone switches;

a database, residing in both said first and second telephone switches, being capable of associating said virtual private line trunk group of said first switch with said virtual private line trunk group of said second switch, and vice versa;

means for detecting a substantially simultaneous requests for service from both said first and second customer premises equipment;

means for selecting one of said first and second customer premises equipment as an originator of call setup and the other as a terminator of call setup and transmitting a Release Message to only said selected call terminator; and means for accepting said request for service from said originator user telephone equipment and continuing to establish said virtual private line connection.

11. The apparatus, as set forth in claim 10, further including at least one telephone coupled to each said first and second customer premises equipment, hereafter first and second telephones, respectively.

12. The apparatus, as set forth in claim 10, wherein said virtual private telephone connection processing means includes means for resolving end-to-end glare.

13. The apparatus, as set forth in claim 12, wherein said end-to-end glare resolving means comprises:

means coupled to said first customer premises equipment for detecting said first telephone being off-hook;

means coupled to said second customer premises equipment for detecting said second telephone being off-hook;

said first switch being adapted for transmitting an SS7 Initial Address Message to said second telephone switch in response to detecting said first telephone being off-hook;

said second switch being adapted for transmitting another SS7 Initial Address Message to said first telephone switch in response to detecting said second telephone being off-hook;

said first and second telephone switches, in response to receiving said SS7 Initial Address Messages from one another, for independently comparing a switch identification number of said first telephone switch with a switch identification number of said second telephone switch;

said first and second telephone switches, in response to said switch identification numbers being equal, being adapted for independently comparing a trunk group identification number of said virtual private line trunk group of said first telephone switch with a trunk group identification number of said virtual private line trunk group of said second telephone switch;

said telephone switch with the lower switch or trunk group identification number being adapted for transmitting an SS7 Release Message to the telephone switch with the higher switch or trunk group identification number;

said telephone switch with the higher switch or trunk group identification number, being adapted for transmitting an SS7 Address Complete Message to the telephone switch with the lower switch or trunk group identification number in response to receiving the SS7 Release Message; and said telephone switch with the higher switch or trunk group identification number, being adapted for transmitting an SS7 Answer Message to the telephone switch with the lower switch or trunk group identification number, and establishing the virtual private line connection.

14. The apparatus, as set forth in claim 11, wherein the virtual private line processing means comprises:

means for detecting said first telephone being off-hook;

means residing in said first telephone switch for transmitting an SS7 Initial Address Message to said second telephone switch;

means coupled to said second customer premises equipment for ringing said second telephone in response to receiving said SS7 Initial Address Message from said first telephone switch;

means residing in said second telephone switch for transmitting an SS7 Address Complete Message to said first telephone switch in response to said received SS7 Initial Address Message;

means coupled to said second customer premises equipment for detecting said second telephone being off-hook; and means residing in said second telephone switch for transmitting an SS7 Answer Message to said first telephone switch in response to detecting said second telephone being off-hook.

15. The apparatus, as set forth in claim 10, wherein said virtual private telephone connection processing means includes means for suspending temporarily and then resuming an already established connection.

16. The apparatus, as set forth in claim 15, wherein said suspending temporarily and resuming means comprises:

in response to establishing the virtual private line connection, means coupled to said first customer premises equipment for detecting said first telephone being on-hook;

means residing in said first telephone switch for transmitting an SS7 Suspend message to said second telephone switch;

a suspend timer residing in said first telephone switch for keeping the time that said first telephone being on-hook, and expiring within a predetermined amount of time;

means for detecting said first telephone being off-hook prior to the expiration of said suspend timer; and means residing in said first telephone switch for transmitting an SS7 Resume message to said second telephone switch, and reestablishing the virtual private line connection.

17. The apparatus, as set forth in claim 10, wherein said virtual private telephone connection processing means includes means for automatic ring down.

18. The apparatus, as set forth in claim 10, wherein said virtual private telephone connection processing means includes means for releasing an established connection.

19. The apparatus, as set forth in claim 10, wherein said virtual private telephone connection processing means includes means for alerting one of said callers that the other caller has hung up.

20. The apparatus, as set forth in claim 19, wherein said virtual private line processing means comprises:

in response to establishing the virtual private line connection, means coupled to said first customer premises equipment for detecting said first telephone being on-hook;

means residing in said first telephone switch for transmitting an SS7 Suspend message to said second telephone switch;

a suspend timer of said first telephone switch adapted for keeping first telephone on-hook time and expiring within a predetermined amount of time;

means residing in said first telephone switch for transmitting an SS7 Release message to said second telephone switch in response to the expiration of said suspend timer;

means residing in said second telephone switch for transmitting an SS7 Release Complete Message to said first telephone switch in response to receiving said SS7 Release Message; and means for issuing a predetermined treatment to said second telephone.

21. The apparatus, as set forth in claim 20, wherein said virtual private line trunk groups include at least one trunk circuit, and said virtual private telephone connection processing means includes means for ignoring an attempt to establish a connection with a trunk circuit while a connection established on the same trunk circuit is in the process of being released.

22. The apparatus, as set forth in claim 21, wherein said virtual private line connection means comprises:

in response to establishing the virtual private line connection, means coupled to said first customer premises equipment for detecting said first telephone being on-hook;

means residing in said first telephone switch for transmitting an SS7 Suspend message to said second telephone switch;

first and second suspend timers residing in respective first and second telephone switches for keeping on-hook time and expiring within a predetermined amount of time;

means residing in said second telephone switch for detecting said second telephone being on-hook prior to the expiration of said second suspend timer;

means for detecting said first telephone being off-hook again prior to the expiration of said first suspend timer;

means residing in said first telephone switch for transmitting an SS7 Resume Message to said second telephone switch in response to detecting said first telephone being off-hook prior to the expiration of said first suspend timer;

means residing in said second telephone switch for transmitting an SS7 Release Message to said first telephone switch in response to detecting said second telephone being on-hook prior to receiving said SS7 Resume Message from said first telephone switch;

means for issuing a predetermined treatment to said first telephone in response to receiving said SS7 Release Message from said second telephone switch; and means residing in said first telephone switch for transmitting an SS7 Release Complete Message to said second telephone switch.

23. A method for establishing a virtual private telephone line connection with automatic ring down between at least one User A telephone equipment coupled to a first telephone switch and at least one User B telephone equipment coupled to a second telephone switch, at least one optional telephone switch coupled between said first and second telephone switches the method comprising the steps of:

detecting substantially simultaneous request for service from both said User A telephone equipment and said User B telephone equipment;

selecting one of said User A telephone equipment and said User B telephone equipment as an originator of call setup and the other as a terminator of call setup and transmitting a Release Message to only said selected terminator of call setup; and accepting said request for service from said originator user telephone equipment and continuing to establish said virtual private line connection.

24. The method, as set forth in claim 23, wherein the virtual private line connection establishing step comprises the steps of:

transmitting an SS7 Initial Address Message from the originating switch to the terminating switch;

ringing the User B telephone in response to receiving the SS7 Initial Address Message at the terminating switch;

transmitting an SS7 Address Complete Message from the terminating switch to the originating switch in response to the SS7 Initial Address Message;

detecting User B telephone being off-hook;

transmitting an SS7 Answer Message from the terminating switch to the originating switch in response to detecting User B telephone being off-hook; and establishing the virtual private line connection.

25. The method, as set forth in claim 23, further comprising the steps of:

after establishing the VPL connection, detecting User A telephone being on-hook;

transmitting an SS7 Suspend message from said originating switch to said terminating switch;

starting a suspend timer due to expire within a predetermined amount of time;

detecting User A being off-hook prior to the expiration of said suspend timer;

transmitting an SS7 Resume message from said originating switch to said terminating switch; and reestablishing the virtual private line connection.

26. The method, as set forth in claim 23, further comprising the step of:

after establishing the VPL connection, detecting User B telephone being on-hook;

transmitting an SS7 Suspend message from said terminating switch to said originating switch;

starting a suspend timer due to expire within a predetermined amount of time;

detecting User B being off-hook prior to the expiration of said suspend timer;

transmitting an SS7 Resume message from said terminating switch to said originating switch; and reestablishing the virtual private line connection.

27. In a switching system, apparatus for establishing a virtual private line connection between first user telephone equipment and second user telephone equipment with a switching network coupled therebetween, comprising:

means for detecting substantially simultaneous request for service from both said first user telephone equipment and said second user telephone equipment;

means for selecting one of said first user telephone equipment and said second user telephone equipment as an originator of call setup and the other as a terminator of call setup and transmitting a Release Message to only said selected call terminator; and means for accepting said request for service from said originator user telephone equipment and continuing to establish said virtual private line connection.

28. The apparatus, as set forth in claim 27, wherein said selecting means includes means for comparing a first identification number associated with said first user telephone equipment with a second identification number associated with said second user telephone equipment as a basis for said selection.

29. The apparatus, as set forth in claim 27, wherein said call setup originator selecting means includes means for comparing a switch and trunk group identification number associated with said first user telephone equipment with a switch and trunk group identification number associated with said second user telephone equipment.

30. The apparatus, as set forth in claim 29, wherein said call setup originator selecting means includes means for selecting the user telephone equipment associated with a lower switch or trunk group identification number.

31. The apparatus, as set forth in claim 27, wherein said accepting means includes means for notifying said terminator to back down in response to said selection.

32. The apparatus, as set forth in claim 27, wherein said accepting means includes:

means for transmitting an SS7 Release Message from the selected originator user telephone equipment to said terminator user telephone equipment;

means for transmitting an SS7 Address Complete Message from said originator user telephone equipment to said terminator user telephone equipment in response to receiving the SS7 Release Message; and means for transmitting an SS7 Answer Message from said selected originator user telephone equipment to said terminator user telephone equipment and establishing the virtual private line connection.

33. A method for resolving end-to-end glare in a virtual private line connection between first telephone equipment and second telephone equipment, with a switching network coupled therebetween, the method comprising the steps of:

detecting both said first telephone equipment and said second telephone equipment being off-hook substantially simultaneously;

selecting one of said first telephone equipment and said second telephone equipment as a call originator of call setup and the other as a call terminator of call setup;

notifying said call terminator telephone equipment to back down and transmitting a Release Message to only said selected call terminator telephone equipment; and establishing said virtual private line connection.

34. The method, as set forth in claim 33, wherein said selecting step includes the steps of:

comparing an identification number associated with said first telephone with an identification number associated with said second telephone; and selecting the telephone with a lower identification number.

35. The method, as set forth in claim 34, wherein said comparing step includes the step of comparing switch identification numbers associated with said respective first and second telephones.

36. The method, as set forth in claim 34, wherein said comparing step includes the step of comparing trunk group identification numbers associated with said respective first and second telephones.

37. The method, as set forth in claim 33, wherein said notification step includes the step of transmitting an SS7 Release Message to said terminating telephone.

\* \* \* \* \*